US009944249B2

(12) United States Patent
Okuyama

(10) Patent No.: US 9,944,249 B2
(45) Date of Patent: Apr. 17, 2018

(54) GAS GENERATOR

(71) Applicant: DAICEL CORPORATION, Osaka-shi, Osaka (JP)

(72) Inventor: Takashi Okuyama, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 15/104,566

(22) PCT Filed: Jan. 5, 2015

(86) PCT No.: PCT/JP2015/050024
§ 371 (c)(1),
(2) Date: Jun. 15, 2016

(87) PCT Pub. No.: WO2015/105067
PCT Pub. Date: Jul. 16, 2015

(65) Prior Publication Data
US 2016/0362082 A1 Dec. 15, 2016

(30) Foreign Application Priority Data
Jan. 9, 2014 (JP) .................................. 2014-002229

(51) Int. Cl.
*C06D 5/00* (2006.01)
*B60R 21/264* (2006.01)
*B60R 21/26* (2011.01)

(52) U.S. Cl.
CPC .. *B60R 21/264* (2013.01); *B60R 2021/26029* (2013.01); *B60R 2021/2642* (2013.01); *B60R 2021/26076* (2013.01)

(58) Field of Classification Search
CPC ........ B60R 21/264; B60R 2021/26029; B60R 2021/26076; B60R 2021/2642
(Continued)

(56) References Cited

U.S. PATENT DOCUMENTS 5,217,697 A 6/1993 Kanazawa et al.
6,139,055 A 10/2000 Dahl et al.
(Continued)

FOREIGN PATENT DOCUMENTS

CN 1764817 A 4/2006
CN 103003656 A 3/2013
(Continued)

*Primary Examiner* — Samir Abdosh
(74) *Attorney, Agent, or Firm* — Birch, Stewart, Kolasch & Birch, LLP

(57) ABSTRACT

A gas generator includes, inside a housing, an ignition device chamber accommodating a transfer charge and an igniter in which an igniter main body is surrounded by an igniter collar. The ignition device chamber is formed such that an inner circumferential wall surface on an opening side of an ignition device chamber cup, which is charged with the transfer charge, is press-fitted to and in close contact with an outer circumferential wall surface of the igniter collar of the igniter. The ratio (Vh2/Vh1) of an average Vickers hardness (Vh1) of the igniter collar, which is measured by a method described in Examples, and an average Vickers hardness (Vh2) of the ignition device chamber cup, which is measured by a method described in Examples, is within a range of 0.25 to 0.65.

3 Claims, 2 Drawing Sheets

(58) Field of Classification Search
USPC .................. 102/530, 531; 280/736, 737, 741
See application file for complete search history.

(56) References Cited

U.S. PATENT DOCUMENTS

| | | | |
|---|---|---|---|
| 6,474,684 B1* | 11/2002 | Ludwig | B60R 21/2644 |
| | | | 280/736 |
| 2004/0251667 A1 | 12/2004 | Harada et al. | |
| 2010/0071580 A1 | 3/2010 | Nakayasu et al. | |
| 2010/0275430 A1 | 11/2010 | Kubo et al. | |
| 2012/0024186 A1 | 2/2012 | Mitsunabe et al. | |
| 2012/0048137 A1 | 3/2012 | Hagihara et al. | |
| 2014/0096697 A1* | 4/2014 | Okuyama | B60R 21/2644 |
| | | | 102/530 |
| 2016/0200285 A1* | 7/2016 | Okuyama | B60R 21/2644 |
| | | | 102/530 |

FOREIGN PATENT DOCUMENTS

| | | |
|---|---|---|
| JP | 5-4035 A | 1/1993 |
| JP | 2002-216888 A | 8/2002 |
| JP | 2005-337475 A | 12/2005 |
| JP | 2007-118788 A | 5/2007 |
| JP | 2010-892 A | 1/2010 |
| JP | 2010-70073 A | 4/2010 |
| JP | 2011-143777 A | 7/2011 |
| WO | WO 2006/077952 A1 | 7/2006 |
| WO | WO 2010/032768 A1 | 3/2010 |

* cited by examiner

[Fig. 1]
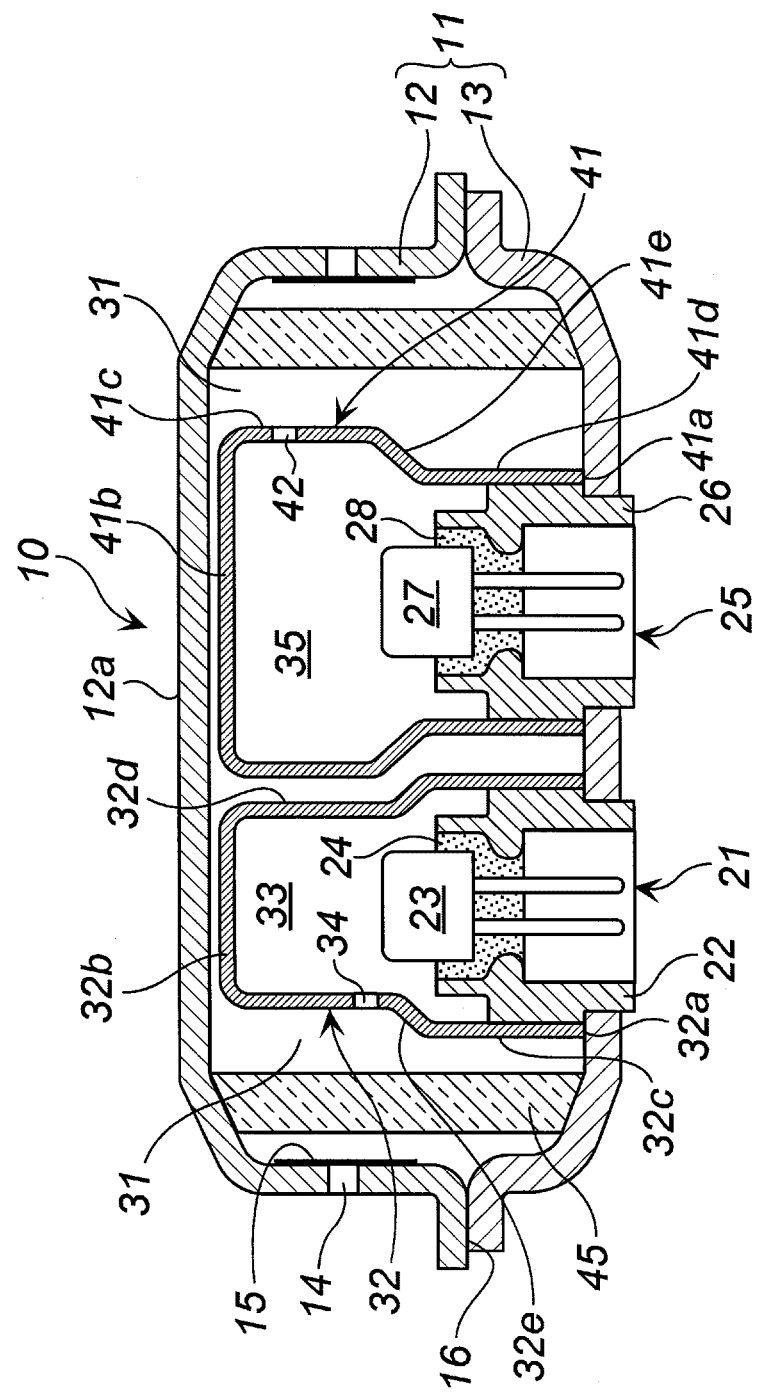

[Fig. 2]
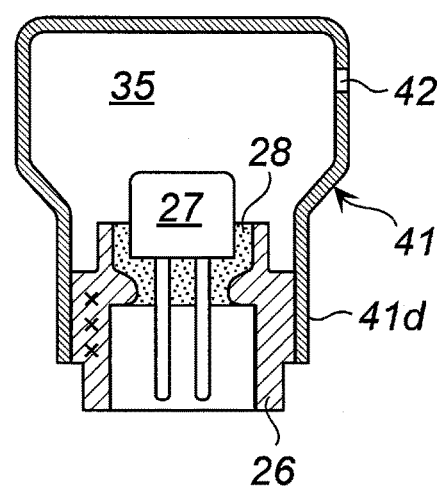
(a)
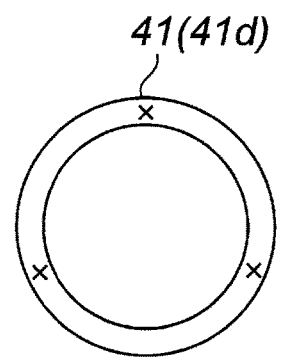
(b)

GAS GENERATOR

FIELD OF INVENTION

The present invention relates to a gas generator used for an airbag apparatus for an automobile and the like.

DESCRIPTION OF THE RELATED ART

In a gas generator including a gas generating agent and being usable for an airbag apparatus for an automobile and the like, an electric igniter for igniting the gas generating agent is accommodated inside a housing.

Generally in the electric igniter, an igniter main body, which has an ignition portion and an electroconductive pin, is enclosed in an igniter collar, and the electric igniter is fixed to the housing at the igniter collar portion.

In order to enhance an ability to ignite a gas generating agent, the electric igniter inside the housing is often used in combination with a transfer charge (or a gas generating agent serving as a transfer charge).

In a gas generator disclosed in JP-A No. H05-4035, an ignition chamber cover 3 is mounted on an ignition case 2 by screwing together a male screw portion 3a of the ignition chamber cover 3 with a female screw portion 2c at the lower portion of the ignition case 2 (in Paragraph 0026).

In a gas generator disclosed in U.S. Pat. No. 6,139,055, a housing 52 is press-fitted by a usual press-fitting method to an adaptor plug 70 depicted in FIG. 1 (in Lines 65-67 in Column 6). It is also indicated that the housing 52 can be of a variety of cross-sectional shapes (in Lines 54-57 in Column 5).

JP-A No. 2010-000892 discloses that a first cup member 32 is fitted to a first igniter collar 22 in Paragraph 0033 and that a second cup member 41 is fitted to a second igniter collar 26 in paragraph 0036, but no specific means for increasing the contact strength of the cup members and the collars is described.

JP-A No. 2010-070073 discloses that a combustion chamber cup 30 is fitted to a collar 41 in Paragraph 0030, but no specific means for increasing the contact strength of the cup and the collar is described.

JP-A No. 2007-118788 discloses that an enhancer chamber cup member 132 is fitted to a first igniter collar 122 in Paragraph 0069 and that a combustion chamber cup member 141 is press-fitted to a second igniter collar 126 in Paragraph 0070, but no specific means for increasing the contact strength of the cup members and the collars is described.

JP-A No. 2011-143777 discloses in Paragraph 0011 that when a housing with a small diameter is formed by using a high-strength member such as a high-tensile strength steel sheet as a housing material for a gas generator and press-molding the high-strength member, a sufficient strength is difficult to impart to the housing, particularly under a low-temperature environment. Further, it is disclosed that a treatment such as annealing is needed to resolve the above problem, but where such annealing treatment is performed, a pressure resistance, that is needed to withstand the increase in internal pressure inside the working gas generation chamber, cannot be maintained.

SUMMARY OF THE INVENTION

The Invention 1 of the present invention provides a gas generator including, inside a housing, an ignition device chamber accommodating a transfer charge and an igniter in which an igniter main body is surrounded by an igniter collar, the ignition device chamber being formed such that an inner circumferential wall surface on an opening side of an ignition device chamber cup, which is charged with the transfer charge, is press-fitted to and in close contact with an outer circumferential wall surface of the igniter collar of the igniter, the ratio (Vh2/Vh1) of an average Vickers hardness (Vh1) of the igniter collar, which is measured by a method described in Examples, and an average Vickers hardness (Vh2) of the ignition device chamber cup, which is measured by a method described in Examples, being within a range of 0.25 to 0.65.

The Invention 2 of the present invention provides a gas generator including, inside a housing, an ignition device chamber accommodating a transfer charge and a first igniter in which a first igniter main body is surrounded by a first igniter collar, and a combustion chamber accommodating a gas generating agent and a second igniter in which a second igniter main body is surrounded by a second igniter collar, the ignition device chamber being formed such that an inner circumferential wall surface on an opening side of an ignition device chamber cup, which is charged with the transfer charge, is press-fitted to and in close contact with an outer circumferential wall surface of the first igniter collar of the first igniter, in the ignition device chamber, the ratio (Vh2/Vh1) of an average Vickers hardness (Vh1) of the first igniter collar, which is measured by a method described in Examples, and an average Vickers hardness (Vh2) of the ignition device chamber cup, which is measured by a method described in Examples, being within a range of 0.25 to 0.65, the combustion chamber being formed such that an inner circumferential wall surface on an opening side of a combustion chamber cup, which is charged with the gas generating agent, is press-fitted to and in close contact with an outer circumferential wall surface of the second igniter collar of the second igniter, in the combustion chamber, the ratio (Vh2/Vh1) of an average Vickers hardness (Vh1) of the second igniter collar, which is measured by a method described in Examples, and an average Vickers hardness (Vh2) of the combustion chamber cup, which is measured by a method described in Examples, being within a range of 0.25 to 0.65.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is an axial sectional view of the gas generator in accordance with the present invention.

FIG. 2 is, in (a), an explanatory drawing illustrating a method for measuring an average Vickers hardness of a collar, and in (b), an explanatory drawing illustrating a method for measuring an average Vickers hardness of a cup member.

DETAILED DESCRIPTION OF INVENTION

In the mounting method disclosed in JP-A No. H05-4035, an accurate threading process is needed for the male screw portion 3a of the ignition chamber cover 3 and the female screw portion 2c at the lower portion of the ignition case 2. In addition to this, a screw-engaging process is needed at the time of mounting, which takes relatively a long time to implement.

In the mounting method disclosed in U.S. Pat. No. 6,139,055, the housing 52 is press-fitted (pushed) to the adaptor plug 70 after the shape and size of the housing 52 and the adaptor plug 70 are adjusted. The problem is that air tightness is degraded because of the deformation of parts and insufficient pressure (decrease in adhesion of the housing 52 with the adaptor plug 70) during the press-fitting.

The present invention provides a gas generator which has a combination of an igniter collar of an igniter and a cup member as a component and makes it possible to further increase the contact strength during press-fitting of the cup member to the igniter collar of the igniter.

The gas generator according to the present invention has a combination of the igniter collar of the igniter and the ignition device chamber cup.

The igniter is a known device used as an electric igniter for a gas generator. In the igniter, the periphery of the igniter main body having an ignition portion and an electroconductive pin is enclosed in the igniter collar, if necessary with a resin being interposed therebetween.

The interior of the ignition device chamber cup serves as the ignition device chamber, and the igniter and the transfer charge (an enhancer agent) are accommodated therein.

The igniter collar and the ignition device chamber cup are preferably formed of a carbon steel, or an alloyed steel which is obtained by adding an alloying element such as nickel, chromium, tungsten, manganese, silicon, and molybdenum to a carbon steel.

The abovementioned ratio Vh2/Vh1 is within a range of 0.25 to 0.65, preferably 0.30 to 0.60, more preferably 0.35 to 0.55.

Where Vh2/Vh1 is 1.0 or more, the press-fitting operation itself is very difficult to perform, and where Vh2/Vh1 has a numerical value which is less than 1.0, but close to 1.0 (for example, 0.8 or more and less than 1.0), the difference in hardness between the igniter collar and the ignition device chamber cup is small. As a result, the press-fitting operation is difficult to perform and the degree of adhesion in the contact portions of the igniter collar and the ignition device chamber cup is not sufficiently increased.

The average Vickers hardness (Vh1) of the igniter collar, which is measured by the method described in Examples, is preferably 160 to 210, more preferably 170 to 200, and even more preferably 175 to 195.

The average Vickers hardness (Vh2) of the ignition device chamber cup, which is measured by the method described in Examples, is preferably 55 to 105, more preferably 60 to 100, and even more preferably 65 to 95.

The Vh1 and Vh2 are adjusted such that Vh2/Vh1 is within the above-mentioned ranges.

The Vickers hardness of the ignition device chamber cup is adjusted by annealing after molding into a predetermined cup shape in accordance with a known metal molding method such as stamping and forging.

For annealing, such a method is applied that the ignition device chamber cup is held for about 2 hours preferably at 600° C. to 900° C., more preferably at 700° C. to 800° C.

The Vickers hardness of the igniter collar is determined by the metal used, but may be adjusted by performing the annealing, if necessary.

The Vickers hardness is measured by a known measurement method, and an average value of three measurements is taken as an average Vickers hardness. In the present invention, the measurements are conducted under a test load of 300 g by using a Vickers microhardness testing machine at room temperature, and an average value of three measurements is taken as an average Vickers hardness.

When the ignition device chamber cup and the igniter are assembled, one of the following methods is employed:

a method in which the ignition device chamber cup charged with a predetermined amount of the transfer charge (or the gas generating agent serving as the transfer charge) therein is placed underneath, and the igniter collar of the igniter is press-fitted into an opening of the ignition device chamber cup;

a method in which the igniter collar of the igniter is fixed above and the ignition device chamber cup charged with a predetermined amount of the transfer charge is press-fitted to the igniter collar from the opening; or a method in which an ignition device chamber cup including two separate components, namely, a cylindrical portion and a lid (bottom) portion is used, an opening at one end of the cylindrical portion is press-fitted to the igniter collar of the igniter, the transfer charge is then charged into the cylindrical portion from an opening at the other end, the opening in an opened state at the other end is attached with the lid portion, and then the lid portion is fixed by laser welding or the like.

In the present invention, the ratio (Vh2/Vh1) of the Vickers hardness of the igniter collar and the ignition device chamber cup is adjusted to be within the predetermined range.

Therefore, when the ignition device chamber cup is press-fitted from the opening to the igniter collar, the wall at the opening is deformed to expand outward, thereby facilitating the press-fitting to the igniter collar. After the press-fitting, the wall of the opening shrinks inward and returns to the original shape. As a result, the degree of adhesion of the contact portions of the ignition device chamber cup and the igniter collar is increased.

The gas generator according to the present invention also includes a combination of the igniter collar of the igniter and the ignition device chamber cup and a combination of the igniter collar of the igniter and the combustion chamber cup.

The first igniter and the second igniter are a known device used as an electric igniter for a gas generator. In the igniters, the periphery of the igniter main body having an ignition portion and an electroconductive pin is enclosed in the igniter collar (a first igniter collar, a second igniter collar), if necessary with a resin being interposed therebetween.

The interior of the ignition device chamber cup serves as the ignition device chamber, and the first igniter and the transfer charge (an enhancer agent) are accommodated therein.

The interior of the combustion chamber cup serves as the combustion chamber, and the second igniter and the gas generating agent are accommodated therein.

The igniter collar, the ignition device chamber cup and the combustion chamber cup are preferably formed of a carbon steel, or an alloyed steel which is obtained by adding an alloying element such as nickel, chromium, tungsten, manganese, silicon, and molybdenum to a carbon steel.

The abovementioned ratio Vh2/Vh1 is within a range of 0.25 to 0.65, preferably 0.30 to 0.60, more preferably 0.35 to 0.55.

Where Vh2/Vh1 is 1.0 or more, the press-fitting operation itself is very difficult to perform, and where Vh2/Vh1 has a numerical value which is less than 1.0, but close to 1.0 (for example, 0.8 or more and less than 1.0), the difference in hardness between the igniter collar and the ignition device chamber cup is small. As a result, the press-fitting operation is difficult to perform and the degree of adhesion in the contact portions of the igniter collar and the ignition device chamber cup is not sufficiently increased.

The average Vickers hardness (Vh1) of the igniter collar (the first igniter collar, the second igniter collar), which is measured by the method described in Examples, is preferably 160 to 210, more preferably 170 to 200, and even more preferably 175 to 195.

The average Vickers hardness (Vh2) of the ignition device chamber cup and the combustion chamber cup, which is measured by the method described in Examples, is preferably 55 to 105, more preferably 60 to 100, and even more preferably 65 to 95.

The Vh1 and M12 are adjusted such that Vh2/Vh1 is within the above-mentioned ranges.

When the ignition device chamber cup and the first igniter are assembled, one of the following methods is employed:

a method in which the ignition device chamber cup charged with a predetermined amount of the transfer charge (or the gas generating agent serving as the transfer charge) therein is placed underneath, and the first igniter collar of the first igniter is press-fitted into an opening of the ignition device chamber cup;

a method in which the first igniter collar of the first igniter is fixed above and the ignition device chamber cup charged with a predetermined amount of the transfer charge is press-fitted from the opening to the first igniter collar; or a method in which an ignition device chamber cup including two separate components, namely, a cylindrical portion and a lid (bottom) portion is used, an opening at one end of the cylindrical portion is press-fitted to the first igniter collar of the first igniter, the transfer charge is then charged into the cylindrical portion from an opening at the other end, the opening in an opened state at the other end is attached with the lid portion, and then the lid portion is fixed by laser welding or the like.

When the combustion chamber cup and the second igniter are assembled, one of the following methods is employed:

a method in which the combustion chamber cup charged with a predetermined amount of the gas generating agent therein is placed underneath, and the second igniter collar of the second igniter is press-fitted into an opening of the combustion chamber cup;

a method in which the second igniter collar of the second igniter is fixed above, and the combustion chamber cup charged with a predetermined amount of the gas generating agent is press-fitted from the opening to the second igniter collar; or a method in which an combustion chamber cup including two separate components, namely, a cylindrical portion and a lid portion serving as a bottom portion is used, an opening at one end of the cylindrical portion is press-fitted to the second igniter collar of the second igniter, the gas generating agent is then charged from an opening at the other end, the opening in an opened state at the other end is attached with the lid portion, and then the lid portion is fixed by laser welding or the like.

In the present invention, the ratio (Vh2/Vh1) of the Vickers hardness of the igniter collar (the first igniter collar, the second igniter collar), and the ignition device chamber cup and the combustion chamber cup is adjusted to be within the predetermined range.

Therefore, when the ignition device chamber cup and the combustion chamber cup are press-fitted from an opening to the igniter collar (the first igniter collar, the second igniter collar), the wall at the opening is deformed to expand outward, thereby facilitating the press-fitting to the igniter collar (the first igniter collar, the second igniter collar). After the press-fitting, the wall of the opening shrinks inward and returns to the original shape. As a result, the degree of adhesion of the contact portions of the ignition device chamber cup and the combustion chamber cup, and the igniter collar (the first igniter collar, the second igniter collar) is increased.

In the gas generator according to the present invention, tight adhesion is realized between the cup member for forming the ignition device chamber or the combustion chamber and the igniter collar to which the cup member is press-fitted, and operability during the press-fitting is efficient.

EMBODIMENTS OF THE INVENTION

The present invention is usable for a gas generator in which a cup member and an igniter collar of an igniter are assembled by press-fitting.

For example, the present invention is usable for the gas generator having a combination of the first cup member 32 and the first igniter collar 22 and a combination of the second cup member 41 and the second igniter collar 26 which are depicted in FIG. 1 of JP-A No. 2010-000892, for the gas generator having a combination of the combustion chamber cup 30 and the collar 41 which is depicted in FIG. 1 of JP-A No. 2010-070073, for the gas generator having a combination of the cup 132 and the collar 122 and a combination of the cup 141 and the collar 126 which are depicted in FIG. 3 of JP-A No. 2007-118788.

The present invention will be described with reference to FIG. 1 (the same as FIG. 1 in JP-A No. 2010-000892).

In a gas generator 10, an outer shell is formed by a housing 11 obtained by welding a diffuser shell 12 and a closure shell 13 in a joining portion 16.

A plurality of gas discharge ports 14 are provided in the circumferential surface of the diffuser shell 12, and the gas discharge ports 14 are closed from the inner side with a seal tape 15 made from aluminum or stainless steel.

Two holes are provided in the bottom surface of the closure shell 13, and a first ignition device 21 and a second ignition device 25 are disposed in the respective holes.

The first ignition device 21 has a first igniter 23 which is fixed to a first igniter collar 22, with a resin 24 being interposed therebetween.

The second ignition device 25 has a second igniter 27 which is fixed to a second igniter collar 26, with a resin 28 being interposed therebetween.

The first igniter collar 22 and the second igniter collar 26, and the first igniter 23 and the second igniter 27 are of the same shape and size.

A cylindrical filter 45 is arranged inside the housing 11, and an annular gap is obtained such that the outer circumferential surface of the filter 45 is spaced from the gas discharge ports 14 and the seal tape 15.

A first combustion chamber 31 is defined inside the filter 45 and charged with a first gas generating agent (a known gas generating agent) which is not depicted in the drawing.

A first cup member (an ignition device chamber cup) 32 and a second cup member (a second combustion chamber cup) 41 are disposed side by side in the first combustion chamber 31.

The first cup member 32 has a first diameter-enlarged circumferential wall portion 32c on an opening 32a side and a first diameter-reduced circumferential wall portion 32d on a bottom surface 32b side. The first cup member 32 is fitted onto the first igniter collar 22 so as to cover the first igniter 23 from the opening 32a. The first cup member 32 has a uniform thickness.

The first igniter collar 22 is formed of a carbon steel which is not annealed, and the first cup member (the ignition device chamber cup) 32 is formed of an annealed carbon steel.

The ratio (Vh2/Vh1) of the average Vickers hardness (Vh1) of the first igniter collar 22 and the average Vickers hardness (Vh2) of the first cup member (the ignition device chamber cup) 32 is within a range of 0.25 to 0.65.

A first annular inclined surface 32e is formed in the boundary portion of the first diameter-enlarged circumferential wall portion 32c and the first diameter-reduced circumferential wall portion 32d, and a plurality of first communication holes 34 are formed in the first diameter-reduced circumferential wall portion 32d. In FIG. 1, the first communication holes 34 are formed in the vicinity of the first annular inclined surface 32e, but the first communication holes 34 may be positioned closer to the bottom surface 32b than those depicted in FIG. 1 are, provided that they do not face the second cup member 41.

The interior of the first cup member 32 is an enhancer chamber (an ignition device chamber) 33 and is charged with a gas generating agent (a known enhancer agent or gas generating agent serving as an enhancer agent can be used), not depicted in the drawing. If necessary, the gas generating agent is accommodated in an aluminum bag-shaped container.

By selecting, as appropriate, a type, composition, and shape of the gas generating agent, it is possible to use the action of igniting and burning the gas generating agent inside the first combustion chamber 31 and the gas generated by the combustion of the gas generating agent itself.

The second cup member 41 has a second diameter-reduced circumferential wall portion 41d on an opening 41a side and a second diameter-enlarged circumferential wall portion 41c on a bottom surface 41b side and is fitted onto the second igniter collar 26 so as to cover the second igniter 27 from the opening 41a. The second cup member 41 has a uniform thickness.

The second igniter collar 26 is formed of a carbon steel which is not annealed, and the second cup member (the second combustion chamber cup) 41 is formed of an annealed carbon steel.

The ratio (Vh2/Vh1) of the average Vickers hardness (Vh1) of the second igniter collar 26 and the average Vickers hardness (Vh2) of the second cup member (the second combustion chamber cup) 41 is within a range of 0.25 to 0.65.

A second annular inclined surface 41e is formed in the boundary portion of the second diameter-reduced circumferential wall portion 41d and the second diameter-enlarged circumferential wall portion 41c, and a plurality of second communication holes 42 are formed in the second diameter-enlarged circumferential wall portion 41c. The plurality of the second communication holes 42 are closed from the outside with a seal tape.

In FIG. 1, the second communication holes 42 are formed in the vicinity of the bottom surface 41b, but the second communication holes may be positioned closer to the second annular inclined surface 41e than those depicted in FIG. 1 are, or formed in the second annular inclined surface 41e or in the bottom surface 41b, provided that they do not face the first cup member 32. When they are formed in the bottom surface 41b, a gap is formed between the bottom surface 41b and a top plate 12a of the diffuser shell 12.

The interior of the second cup member 41 is a second combustion chamber 35 and is charged with a second gas generating agent (a known gas generating agent can be used), not depicted in the drawing. If necessary, the gas generating agent is accommodated in an aluminum bag-shaped container.

In the cross section depicted in FIG. 1, the first cup member 32 and the second cup member 41 have the same thickness and cross-sectional shapes such that the two cup members are fitted to each other. The first cup member 32 and the second cup member 41 are disposed such that the first diameter-enlarged circumferential wall portion 32c and the second diameter-reduced circumferential wall portion 41d are arranged side by side, radially at a distance from each other, and the first diameter-reduced circumferential wall portion 32d and the second diameter-enlarged circumferential wall portion 41c are arranged side by side, radially at a distance from each other.

The distance between the first cup member 32 and the second cup member 41 is set by increasing or decreasing the outer diameters of the first cup member 32 and the second cup member 41 according to the degree in increase or decrease of a volume of the enhancer chamber 33 and a volume of the second combustion chamber 35.

Further, the volume of the first combustion chamber 31 is increased by reducing the distance between the first cup member 32 and the second cup member 41.

It is preferred that the distance between the first cup member 32 and the second cup member 41 is such that the first gas generating agent does not enter therein and such that the combustion in the enhancer chamber 33 does not affect the second combustion chamber 35.

The first communication holes 34 and the second communication holes 42 are formed such that they have different height positions in the axial direction. As a result, combustion products are prevented from concentrating at the same height position of the filter 45.

In the process of assembling the gas generator 10 depicted in FIG. 1, the first cup member 32 is press-fitted to the first igniter collar 22 so as to cover the first igniter 23 from the opening 32a.

At this time, since the ratio (Vh2/Vh1) of the average Vickers hardness (Vh1) of the first igniter collar 22 and the average Vickers hardness (Vh2) of the first cup member (the ignition device chamber cup) 32 is within a range of 0.25 to 0.65, the opening 32a of the first cup member 32 expands outward, thereby facilitating the press-fitting to the first igniter collar 22. After the press-fitting, the opening 32a shrinks inward and returns to the original shape. As a result, the contact portions of the first igniter collar 22 and the first cup member (the ignition device chamber cup) 32 are in close contact with each other.

Further, in the process of assembling the gas generator 10 depicted in FIG. 1, the second cup member 41 is press-fitted to the second igniter collar 26 so as to cover the second igniter 27 from the opening 41a.

At this time, since the ratio (Vh2/Vh1) of the average Vickers hardness (Vh1) of the second igniter collar 26 and the average Vickers hardness (Vh2) of the second cup member (the combustion chamber cup) 41 is within a range of 0.25 to 0.65, the opening 41a of the second cup member 41 expands outward, thereby facilitating the press-fitting to the second igniter collar 26. After the press-fitting, the opening 41a shrinks inward and returns to the original shape. As a result, the contact portions of the second igniter collar 26 and the second cup member (the combustion chamber cup) 41 are in close contact with each other.

An operation of the gas generator will be described hereinbelow with reference to FIG. 1.

Described hereinbelow is an example in which the gas generator is incorporated in an airbag system and installed in an automobile. The first igniter 23 and the second igniter 27 are actuated as follows according to a degree of an impact received by an automobile at a time of collision: only the first igniter 23 is actuated; the first igniter 23 is initially actuated and the second igniter 27 is actuated with delay; and the first igniter 23 and the second igniter 27 are actuated simultaneously. The following is the case in which the first igniter 23 is initially actuated and the second igniter 27 is actuated with delay.

When the automobile collides and receives an impact, an actuation signal is received from a control unit so that the first igniter 23 is actuated and ignited, thereby igniting and burning the gas generating agent inside the enhancer chamber 33 to generate the combustion product (a high-temperature gas or a flame). In this case, since the contact portions of the first cup member 32 and the first igniter collar 22 are in close contact with each other, the combustion product does not leak from the contact portions.

The combustion product enters the first combustion chamber 31 through the first communication holes 34, and ignites and burns the first gas generating agent to generate a combustion gas. In this case, since the first communication holes 34 are spaced from the filter 45 and are not formed to directly face the second cup member 41, the second gas generating agent inside the second combustion chamber 35 is not ignited and burned by the combustion product of the enhancer agent.

The combustion gas generated from the first gas generating agent inside the first combustion chamber 31 is filtered and cooled while passing through the filter 45. Then, the combustion gas breaks the seal tape 15 and is released from the gas discharge ports 14 to inflate the airbag.

In this case, since the second communication holes 42 are closed by a seal tape (not depicted in the drawing) from the outside, the second gas generating agent inside the second combustion chamber 35 is not ignited and burned by the combustion gas generated by the combustion of the first gas generating agent.

The second igniter 27 is actuated and ignited later than the first igniter 23 to ignite and burn the second gas generating agent inside the second combustion chamber 35, thereby generating a combustion gas. In this case, since the contact portions of the second cup member 41 and the second igniter collar 26 are in close contact with each other, the combustion gas does not leak from the contact portions.

The combustion gas breaks the seal tape (not depicted in the drawing) of the second communication holes 42, flows out from the second communication holes 42 to the first combustion chamber 31. The combustion gas is then filtered and cooled while passing through the filter 45 and released from the gas discharge ports 14 to inflate the airbag.

EXAMPLES

Example 1 and Comparative Example 1

A method for measuring the average Vickers hardness of the first igniter collar 22 and the second igniter collar 26 is described hereinbelow. These two collars were measured in accordance with the same method, and the values measured thereby were the same. In the followings, the measurement method regarding the second igniter collar 26 will be described.

The first igniter collar 22 and the second igniter collar 26 were each formed of a carbon steel (C content 0.15% by mass), and in Example 1 and Comparative Example 1, the carbon steels were not annealed.

The second igniter collar 26 was cut in the axial direction, and the cut surface was polished to be smooth with a polishing machine. The Vickers hardness of the resulting measurement sample was measured under a test load of 300 g by using a Vickers microhardness testing machine (model HM-211, manufactured by Mitutoyo Corporation) at room temperature.

The measurement locations were intermediate positions in the sheet thickness (the positions represented by three x symbols in (a) in FIG. 2) at three points of different height in the portion in which the second igniter collar 26 was in contact with the second diameter-reduced circumferential wall portion 41$d$ of the second cup member 41. The results are shown in Table 1.

A Method for measuring the average Vickers hardness of the first cup member 32 and the second cup member 41 is described hereinbelow. These two cups were measured in accordance with the same method, and the values measured thereby were the same. In the followings, the measurement method regarding the second cup member 41 will be described.

The first cup member 32 and the second cup member 41 were each formed of a carbon steel (C content 0.08% by mass or less). In Example 1, the steel was annealed for 2 hours at 800° C. after molding, and in Comparative Example 1, no annealing was performed after molding.

The second cup member 41 was cut in the radial direction at the second diameter-reduced circumferential wall portion 41$d$ which was in contact with the second igniter collar 26, and the cut surface was then polished to be smooth with a polishing machine. The Vickers hardness of the resulting measurement sample was measured under a test load of 300 g by using a Vickers microhardness testing machine (model HM-211, manufactured by Mitutoyo Corporation) at room temperature.

The measurement locations were intermediate positions in the sheet thickness (the positions represented by three x symbols in (b) in FIG. 2) at three points spaced equidistantly in the circumferential direction. The results are shown in Table 1.

TABLE 1

|  |  | Vickers hardness | | | | |
| --- | --- | --- | --- | --- | --- | --- |
|  |  | 1 | 2 | 3 | Average value | Vh2/Vh1 |
| Example 1 | Cup member (Vh2) | 80 | 79 | 111 | 90 | 0.49 |
|  | Igniter collar (Vh1) | 190 | 176 | 182 | 183 |  |
| Comparative Example 1 | Cup member (Vh2) | 162 | 159 | 166 | 162 | 0.89 |
|  | Igniter collar (Vh1) | 190 | 176 | 182 | 183 |  |

A combination of the first igniter collar 22 and the first cup member 32 and a combination of the second igniter collar 26 and the second cup member 41 in each of Example 1 and Comparative Example 1, which had the average Vickers hardness shown in Table 1 respectively, were used to perform the press-fitting of the cup members to the collars.

In the result, the press-fitting of the collars and cup members in Example 1 were easily performed and the adhesion of the collars and the cup members after the press-fitting was good.

Meanwhile, in the press-fitting of the collars and the cup members of Comparative Example 1, the expansion deformation of the cup members was small and the press-fitting was more difficult than that in Example 1. The adhesion of the collars and the cup members after the press-fitting was also unsatisfactory, as compared with Example 1, because the shrinkage of the cup members hardly occurs.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of assembling a gas generator that includes: a housing; an ignition device chamber cup made of metal and provided inside the housing, the ignition device chamber cup defining, therein, an ignition device chamber accommodating a transfer charge or a gas generating agent; and an igniter, provided in the ignition device chamber and having an igniter main body surrounded by an igniter collar made of metal, the method comprising:

providing the igniter collar with an average Vickers hardness (Vh1) and providing the ignition device chamber cup with an average Vickers hardness (Vh2) such that a ratio (Vh2/Vh1) is within a range of 0.25 to 0.65; and press-fitting the ignition device chamber cup over the ignition collar, with an inner circumferential wall surface on an opening side of the ignition device chamber cup being in close contact with an outer circumferential wall surface of the igniter collar, such that the opening of the ignition device chamber cup deforms and expands outwardly during press-fitting and shrinks and returns to the original shape after press-fitting, wherein the average Vickers hardness (Vh1) of the igniter collar is measured by (a) cutting the igniter collar in an axial direction, polishing the cut surface with a polishing machine, and measuring the Vickers hardness of the resulting measurement sample at room temperature with a Vickers microhardness testing machine (model HM-211, manufactured by Mitutoyo Corporation) under a test load of 300 g, with (b) measurement locations at three different heights and intermediate positions in the thickness of the portion of the igniter collar to contact the ignition device chamber cup, and wherein the average Vickers hardness (Vh2) of the ignition device chamber cup is measured by (c) cutting the ignition device chamber cup in the radial direction at a portion to contact the igniter collar, polishing the cut surface with a polishing machine, and measuring the Vickers hardness of the resulting measurement sample at room temperature with a Vickers microhardness testing machine (model HM-211, manufactured by Mitutoyo Corporation) under a test load of 300 g, with (d) measurement locations at circumferentially equidistant three points and intermediate the thickness of the ignition device chamber cup.

2. The method according to claim 1, wherein the average Vickers hardness (Vh2) of the ignition device chamber cup is within a range of 55 to 105.

3. The gas generator according to claim 1, wherein the igniter collar and the ignition device chamber cup are formed of a carbon steel, or an alloyed steel which is a carbon steel added with an alloying element selected from nickel, chromium, tungsten, manganese, silicon, and molybdenum.

* * * * *